(12) United States Patent
Cheatham

(10) Patent No.: US 11,465,703 B2
(45) Date of Patent: Oct. 11, 2022

(54) BICYCLE REST—IMPOTENCE PREVENTION

(71) Applicant: Robert Earl Cheatham, Charlotte, NC (US)

(72) Inventor: Robert Earl Cheatham, Charlotte, NC (US)

( * ) Notice: Subject to any disclaimer, the term of this patent is extended or adjusted under 35 U.S.C. 154(b) by 0 days.

(21) Appl. No.: 16/988,633

(22) Filed: Dec. 28, 2020

(65) Prior Publication Data

US 2021/0197911 A1  Jul. 1, 2021

(51) Int. Cl.
*B62J 1/00* (2006.01)
*B62J 1/12* (2006.01)

(52) U.S. Cl.
CPC ............... *B62J 1/12* (2013.01); *B62J 1/007* (2013.01)

(58) Field of Classification Search
CPC ........................................................ B62J 1/28
USPC ....................................... 297/215.11, 215.12
See application file for complete search history.

(56) References Cited

U.S. PATENT DOCUMENTS

| | | | | |
|---|---|---|---|---|
| 553,722 A * | 1/1896 | Prall | ...................... | B62J 27/00 |
| | | | | 297/383 |
| 620,688 A * | 3/1899 | Wood | ..................... | A47C 1/027 |
| | | | | 297/373 |
| 3,874,730 A * | 4/1975 | Marchello | ................ | B62J 1/005 |
| | | | | 297/202 |
| 4,108,462 A * | 8/1978 | Martin | ...................... | B62J 1/00 |
| | | | | 248/286.1 |
| 4,176,880 A * | 12/1979 | Marchello | .................. | B62J 1/00 |
| | | | | 297/214 |
| 6,206,399 B1 * | 3/2001 | Schnitzenbaumer | ...... | B62J 1/28 |
| | | | | 280/304.4 |
| 6,378,938 B1 * | 4/2002 | Nelson | ..................... | B62J 1/007 |
| | | | | 297/202 |
| 8,011,725 B2 * | 9/2011 | Andrews | .................... | B62J 1/28 |
| | | | | 297/215.12 |
| 8,668,219 B1 * | 3/2014 | Pare | ........................... | B62J 1/28 |
| | | | | 280/288.4 |
| 9,968,195 B2 * | 5/2018 | Sheinkop | ............... | A47C 7/006 |

\* cited by examiner

*Primary Examiner* — Sarah B McPartlin
(74) *Attorney, Agent, or Firm* — NK Patent Law

(57) ABSTRACT

The invention provides method for bicycle riders to rest without sitting. The device can be any shape but the most common shape will be that of a wing. The device will be located behind the rider similar to location of a common bicycle seat. It was designed for men but can be enjoyed by women that do not find the common bicycle seat to be comfortable.

3 Claims, 4 Drawing Sheets

Consolidated View

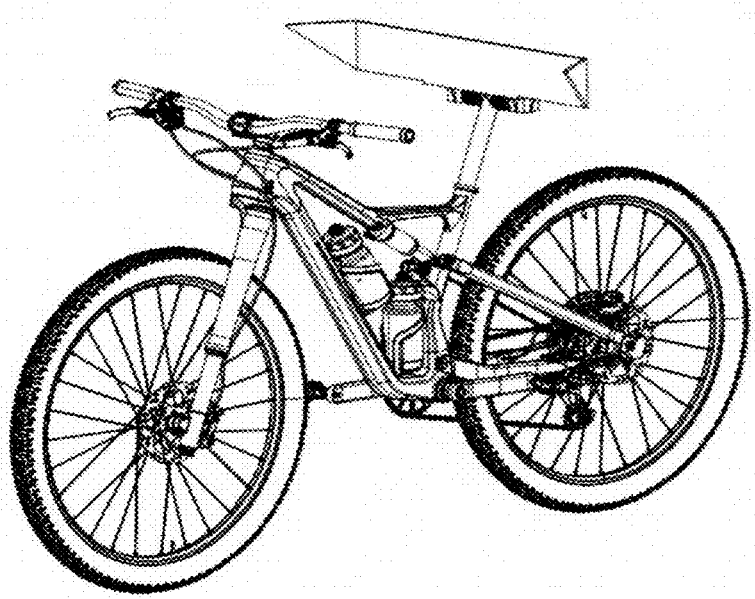
Figure 1 – Front View

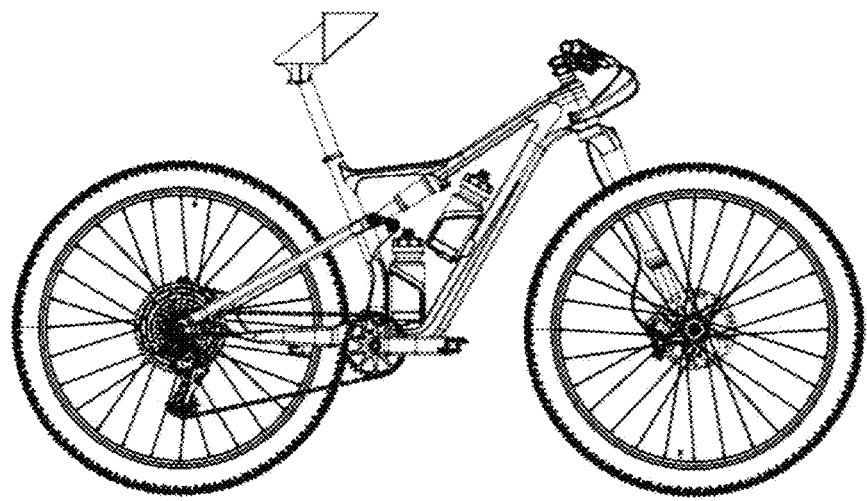
Figure 2 – Side View

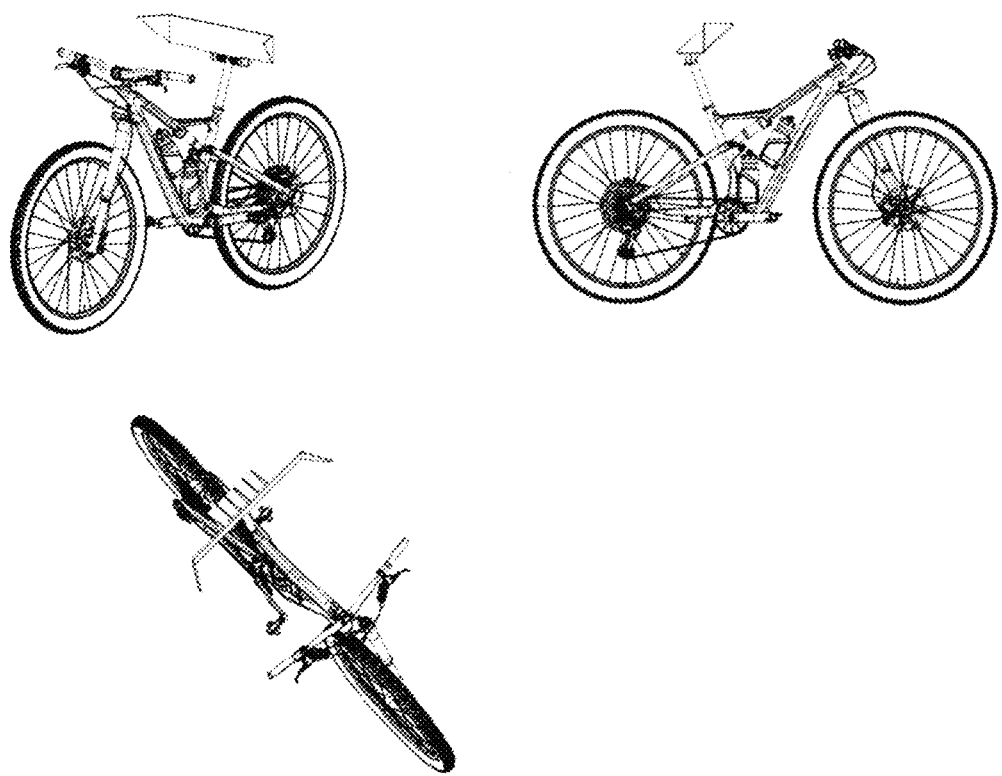
Figure 3 – Consolidated View

Figure 4 – Top View
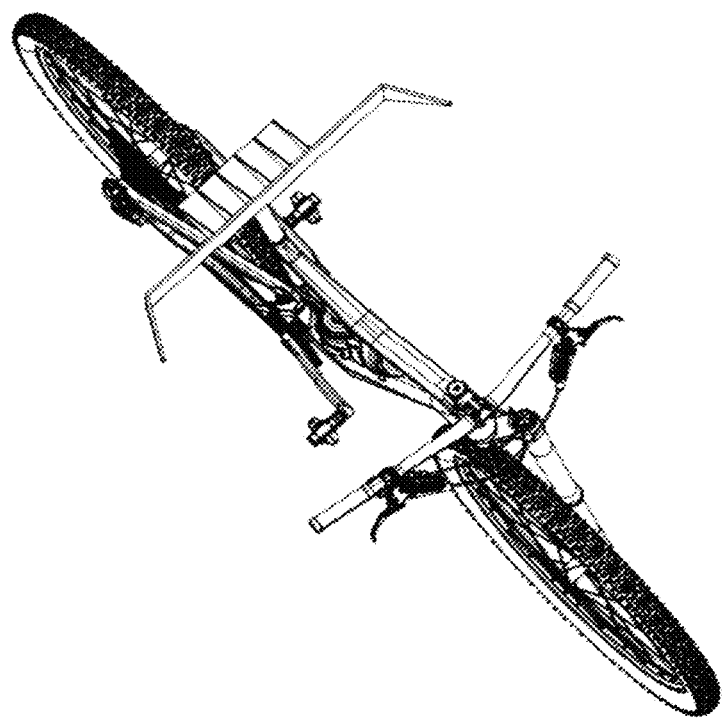

BICYCLE REST—IMPOTENCE PREVENTION

BRIEF SUMMARY

Attached is my request to patent a replacement for the common bicycle seat. The name of my invention is a Bicycle Rest, this is not a bicycle seat. This design allows the rider to lean back against a wing, round or other shaped rest while riding but the rider can never sit down. The design of the rest is attached with non-scaled dimensions. The dimensions will be altered to fit the rider based upon a size such as small, medium, and large. The rest will be made of fiberglass, metal, plastic, wood or other material. The rest will be molded or carved to fit the size of the rider, based upon small, medium, large and X factor size dimensions. This is a replacement for a normal bicycle seat. The rest was designed and created to prevent impotence in men that like to ride bikes. The newly created bicycle rest will assist in preventing both prostatitis and impotence in men due to the position of the bicycle seat while riding. The design can be of any shape, but the most common shape will be a wing shape. The wing shape will have a flat surface with two triangular shaped sides but can be round or any other shape. With the exception of sitting, the method used to ride a bicycle will not change. The new Bicycle Rest will simply allow the rider to lean back to rest. In order to mass produce the Bicycle Rest, the most common method used to manufacture the rest will be produced using a mold made of fiberglass or plastic based upon the size needed. Custom Bicycle Rests will be made to order using other materials such as wood and metal. Custom Bicycle Rests will also be much more costly and will take longer to manufacture.

BRIEF DESCRIPTION OF DRAWINGS

FIG. 1 Description:

This is a view of the bicycle rest from the front of the bicycle. The rider will have the ability to rest using the device by leaning back while riding.

FIG. 2 Description:

This is a view of the bicycle rest from the side of the bicycle. The view shows that the rider does not have to lean back if he\she decides that standing is a better posture, but the ability to lean back while riding is always optional.

FIG. 3 Description:

This is a consolidated view of the bicycle rest from all angles described. The view shows the full design of the device from different angles.

FIG. 4 Description:

This is a view of the device from the top. The width of the device will depend upon the size of the rider. Smaller riders may choose to purchase a device with less width.

FIGURE ALL DESCRIPTION

All Figures represent different views of the Impotence Prevention Bicycle Rest. Each figure provides a clear but different view of how the rest will be positioned upon a bicycle.

Figure All—Summary

All Figures above represent different views of the Impotence Prevention Bicycle Rest. Each figure provides a clear but different view of how the rest will be positioned upon a bicycle.

A Bicycle apparatus that comprises of a winged, circular or other shaped object that is designed to prevent sitting while riding but it allows the rider to rest by leaning back when riding, see figures.

What are the elements that make up the invention?

1) Wing, circular or another shaped object that allows the rider to lean back while riding but does not allow the rider to sit.

Example: Single flat object in the shape of a wing that is attached to a bike seat post. At the top of the post is a spring action swivel that will allow the rider to comfortably lean back when resting is required.

How do the elements relate to one another?

1) Single object that allows a rider to rest when needed.

Do you have more than one invention? No

Tangible: Apparatus

1) The solution is a winged, circular or other shaped object that allows support for a rider that is leaning back when riding.

Method: Using

Are there multiple embodiments of the same invention? Yes, the device can be any shape but the example that I am providing has the shape of a wing.

The invention claimed is:

1. A support structure for use with a bicycle of the type having a bike-rest upright for engaging a bicycle seat, the support structure comprising:

a panel having a top edge opposite a bottom edge and a front and back side extending relative to a bicycle to which the support structure is engaged with;

a pivoting connector attached to a back side of the panel adjacent a bottom edge thereof, wherein the pivoting connector is configured for engaging with a rider upright of the bicycle, wherein, the panel has a first, stowed position in which the panel is in a generally lay flat orientation having a front side disposed toward the bicycle in order to reduce aerodynamic resistance of the panel, and a second, in use position in which the panel is pivoted into a generally upright orientation for the bicyclist to rest their back or buttocks against the front side thereof, wherein the pivoting connector is coupled to the bike-rest upright to replace the seat of the bicycle, wherein the pivoting connector comprises a biasing spring that biases the panel from the in use position to the generally lay flat position and allows the panel to pivot from the lay flat position to the in use position in response to a bicyclist pressing their back or buttocks against the front side of the panel adjacent the top edge.

2. The support structure of claim 1, wherein the panel includes forward facing wings that face forward when the panel is in the in use position, each of the wings of the pair of forwardly facing wings being at terminal, opposing ends of the panel.

3. The support structure of claim 1, wherein the panel's shape comprises one of round, oval, or rectangular.

\* \* \* \* \*